Sept. 29, 1953 R. H. DAVIES ET AL 2,653,841
ELECTRICALLY DRIVEN MECHANISM
Filed Sept. 18, 1950 4 Sheets-Sheet 1

INVENTORS.
ROBERT H. DAVIES
EDWARD R. SIROTAK
BY Geo. B. Pitts
ATTORNEY.

Sept. 29, 1953  R. H. DAVIES ET AL  2,653,841
ELECTRICALLY DRIVEN MECHANISM
Filed Sept. 18, 1950  4 Sheets-Sheet 2

INVENTORS.
ROBERT H. DAVIES
EDWARD R. SIROTAK
BY Geo. B. Pitts
ATTORNEY

INVENTORS.
ROBERT H. DAVIES
EDWARD R. SIROTAK
BY Geo. B. Pitts
ATTORNEY.

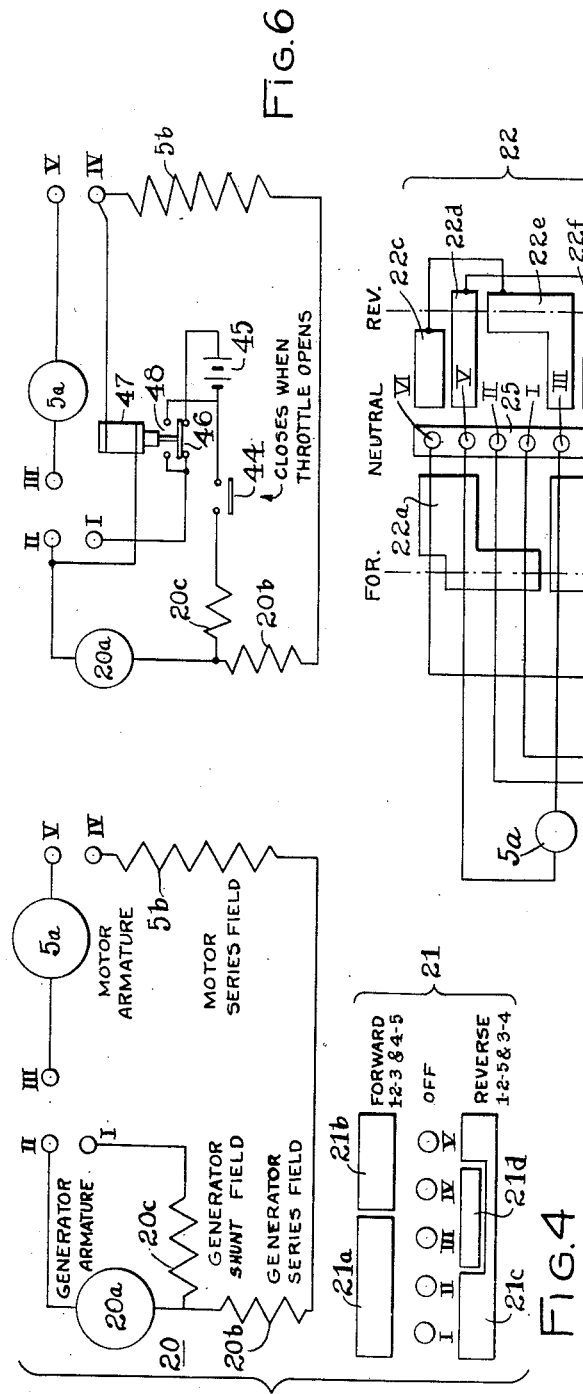
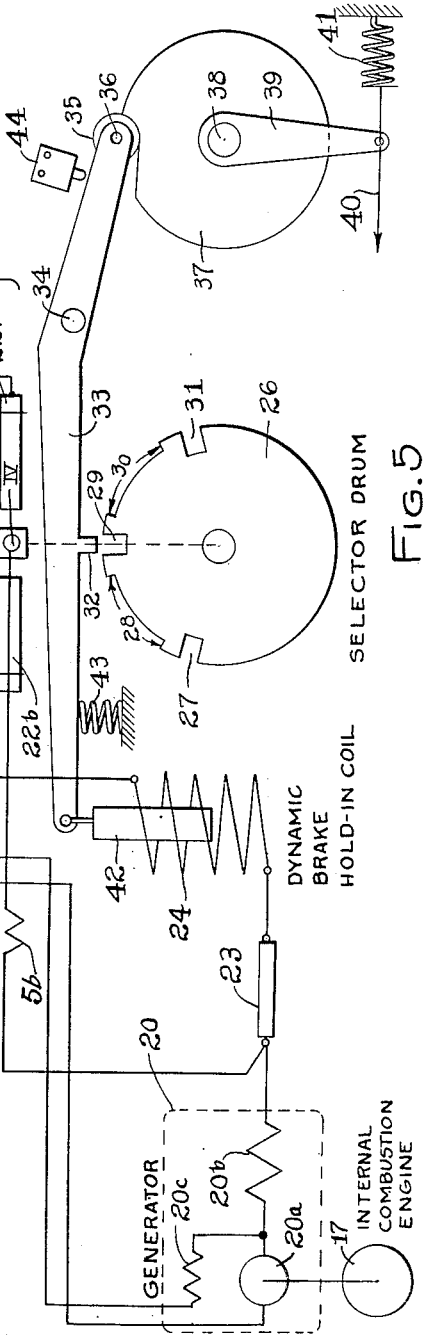

UNITED STATES PATENT OFFICE 2,653,841

ELECTRICALLY DRIVEN MECHANISM

Robert H. Davies, Shaker Heights, and Edward R. Sirotak, Brooklyn Village, Ohio, assignors to The Baker-Raulang Company, Cleveland, Ohio, a corporation of Ohio Application September 18, 1950, Serial No. 185,432

10 Claims. (Cl. 290—17)

This invention relates to electrically driven mechanisms of the type employing an internal combustion engine driven generator for supplying the power to the electric motor for driving the mechanisms such as winches, hoists and vehicles. More particularly the invention relates to an improved control arrangement for the generator and motor. In the illustrated application of the invention, the mechanism to be driven consists of a vehicle.

This invention may be applied to or incorporated in various types of wheel mounted vehicles, the herein illustrated type consisting of an industrial truck.

An object of this invention is to provide an improved control for the electric motor employed for driving a vehicle and the gas engine driven generator supplying the power to the motor.

Another object of this invention is to provide an electric motor mechanically coupled to an axle drive of a vehicle, said motor being supplied by a generator driven by a gas engine; the voltage applied to the motor being variable in a uniform manner from a zero or low idling voltage to full load voltage thereby eliminating the necessity for a clutch between the motor shaft and the vehicle drive.

Still another object of this invention is to provide an electric motor drive for a vehicle, the control of the electric generator that supplies current to the motor being interlocked with the throttle of the gas engine for driving the generator, and wherein the generator shunt field may be controlled for permitting hoisting and tilting operations and operation of attachments of the vehicle while the motor control is in neutral position or excited from a separate source unit the motor reaches a predetermined speed.

Another object of this invention is to provide a motor control for the electric motor driving a vehicle, such that the throttle of the gas engine that drives the generator supplying the current to the motor, must be in the idle position before the selector drum of the motor controller can be rotated.

Still another object of this invention is to provide a dynamic brake to the electric motor employed for driving a vehicle, the control for the dynamic brake being arranged so that dynamic braking is applied to the electric motor on the first movement of the motor controller through its off position to a running position opposite to that previously traveled.

Another object of this invention is to provide a device associated with the motor controller of the electric motor that is employed for driving a vehicle, said mechanical device being controlled by the dynamic braking current so that the rotation of the motor controller is limited to the dynamic braking position until the dynamic braking current decays to a predetermined value.

Another object of the invention is to provide an improved driving mechanism for a vehicle the driven wheel or wheels of which are mechanically coupled to the shaft of a direct current motor and consisting of an internal combustion engine and a compound wound direct current generator mechanically coupled to the shaft of the engine and arranged to supply current to the motor, the speed of the engine shaft being manually controlled, whereby the voltage at the travel motor can be gradually increased from zero to effect smooth starting of the vehicle and operation of the latter at various speeds.

Another object of the invention is to provide an improved electric driven mechanism, wherein the equipment, electric circuits and control devices are materially simplified to economize space and reduce the cost thereof.

Other and further objects of this invention will be apparent to those skilled in the art to which it relates from the following specification, claims and drawings.

In accordance with this invention there is provided an electric drive for a vehicle with appropriate controls so that the current to the electric motor may be supplied by a generator that is driven by a gas engine. The controls are arranged so that low or substantially zero voltage is generated during the idling periods. This is accomplished by disconnecting the generator shunt field. However, when the vehicle is started the shunt field is connected across the generator armature so that the generator voltage builds up gradually and as a result the vehicle starts to move smoothly without jumping or jerking.

This invention eliminates the mechanical clutch or transmission and completely flexible control of the vehicle may be obtained simply by manipulating the gas engine accelerator (preferably by means of a foot pedal) whereby the voltage supplied to the motor driving the vehicle is controlled to provide an indefinite number of speed variations either forward or reverse. No clutch or clutch pedal need be employed in this invention as mentioned above since the vehicle remains stationary even if the control lever is placed in forward or reverse position, unless the accelerator is depressed, because the idling voltage produced by the generator is not sufficient to operate the motor. However, as the accelerator is depressed the vehicle starts to move smoothly and is readily accelerated to maximum speed by the series connected motor.

Furthermore, in accordance with a modified form of this invention, dynamic or regenerative braking is readily applied to the vehicle drive motor. A mechanical linkage is employed between the gas engine throttle and the motor controller so that the throttle must be in the idle position before the motor controller can be operated. This mechanical arrangement is also such that the motor controller is locked in a dynamic braking position on being moved from its off position toward a running position in either direction. If desired this mechanical arrangement may be controlled by the dynamic braking current so that the operation of the motor controller is limited to the dynamic braking position until the braking current decays to a predetermined value.

Referring to the drawing briefly:

Fig. 4 is a wiring diagram of the electric motor and generator together with a view of the controller contact arrangement;

Fig. 5 is a wiring diagram of the drum controller and mechanical interlock associated with the gas engine throttle control; and Fig. 6 is a circuit diagram of a modified control system for connecting the shunt field of the generator to a separate source of current until the motor reaches a certain speed.

Figure 1:
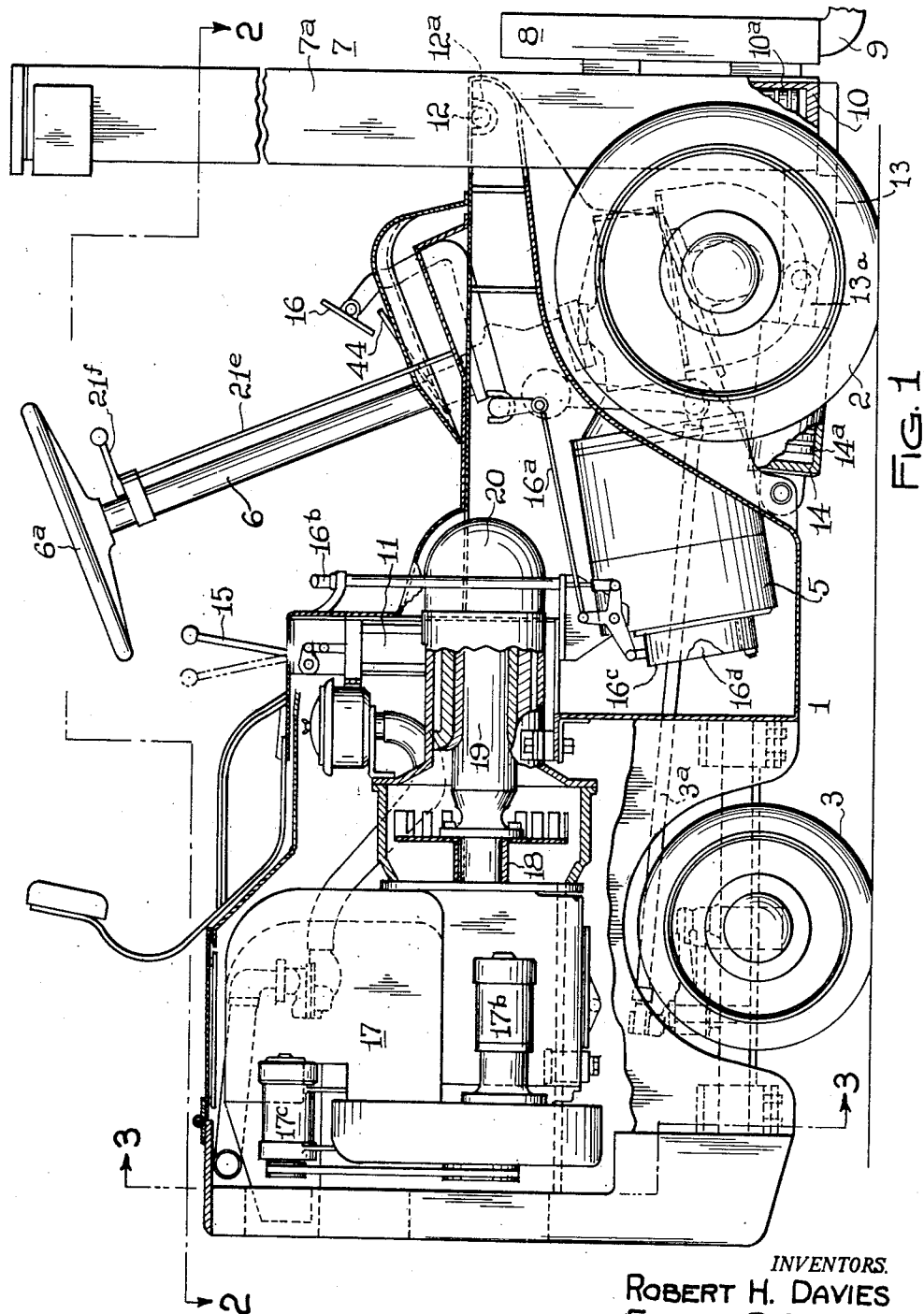
Fig. 1 is a view in side elevation of a vehicle embodying this invention, parts of the vehicle being broken away and parts being shown in section.
Figure 2:
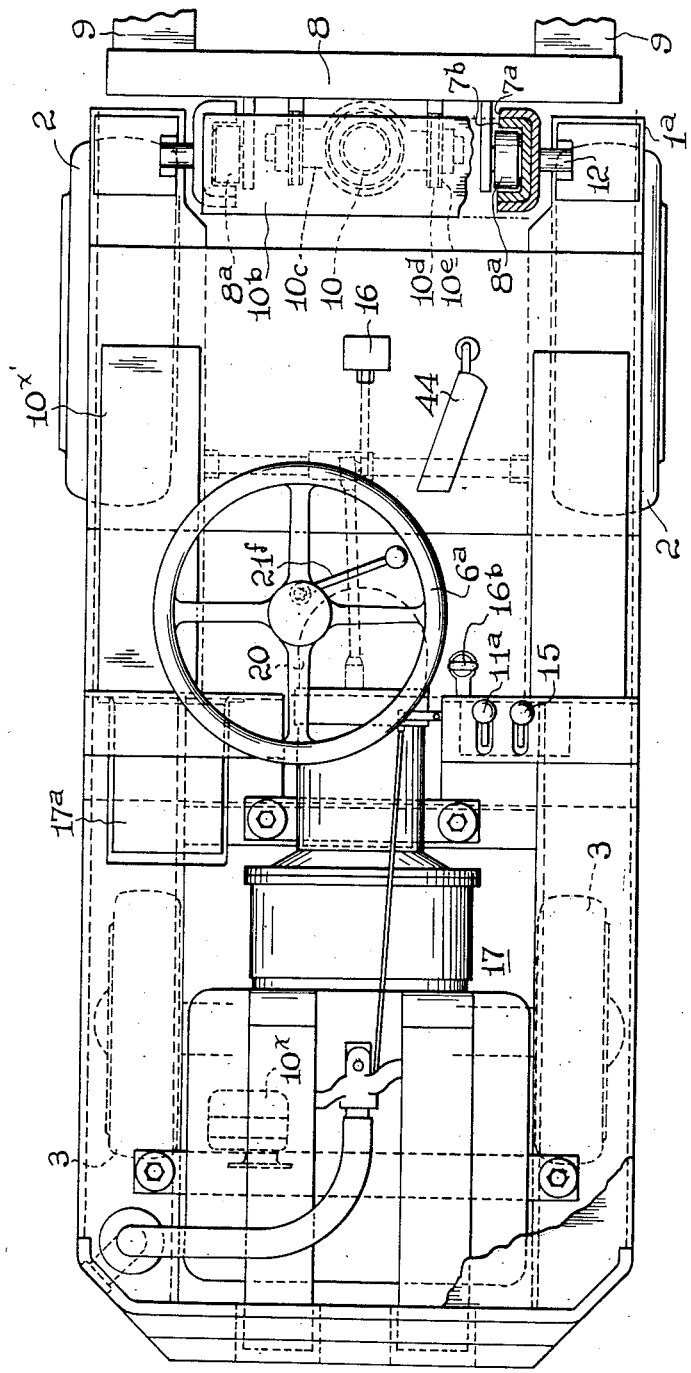
Fig. 2 is a plan view of a vehicle embodying this invention, said view being partly in section taken along the line 2—2 of Fig. 1.
Figure 3:
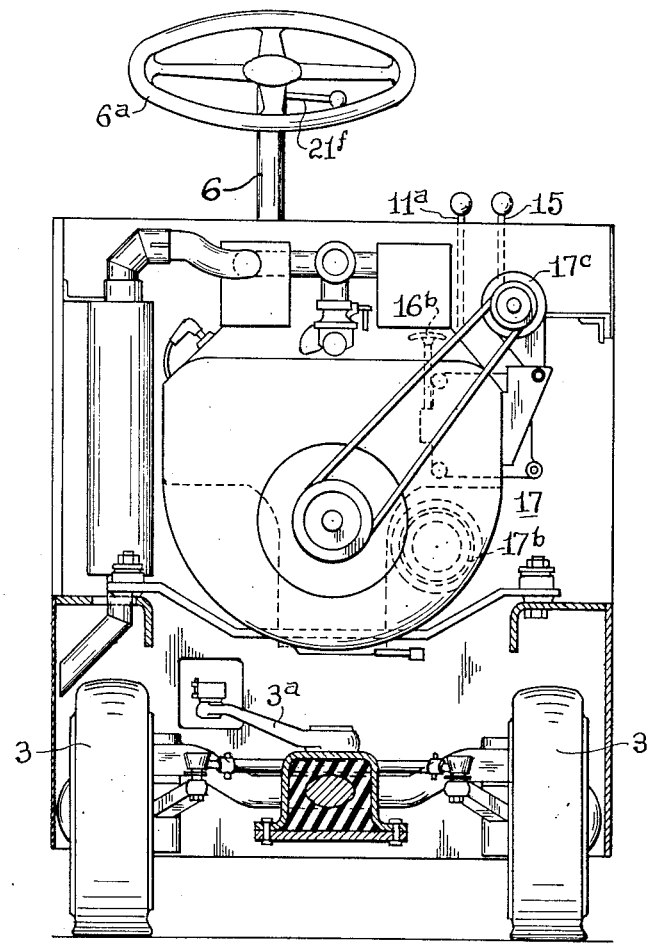
Fig. 3 is a sectional view taken along the line 3—3 of Fig. 1.

In the drawings, the reference numeral 1 indicates as an entirety a frame mounted on front wheels 2 and rear wheels 3. By preference, (a) the front wheels 2 are driven through a suitable transmission mechanism 4 by an electric motor 5, which is supplied with power in the manner later set forth and (b) the rear wheels 3 are mounted on the frame 1 and dirigibly supported as shown in the co-pending application of Robert H. Davies (one of the applicants herein), filed April 15, 1950, Serial No. 156,200, no claim to such mounting for the wheels 3 on the frame 1 being made herein. The wheels 3 are dirigibly supported on the mounting and operated into steering positions by linkage 3a, operatively connected to a shaft extending through a column 6 and connected to a steering device 6a.

The reference numeral 7 indicates as an entirety an elevating mechanism consisting of outer upright guides 7a and inner or extensible guides 7b arranged to slide endwise on the guides 7a. An elevating member 8 is mounted on upper and lower pairs of rollers 8a which engage the inner walls of the guides 7b. The elevating member 8 supports a load carrier 9, shown herein as consisting of a pair of forks. The elevating member 8 is raised hydraulically by the piston 10a that is enclosed in the cylinder 10 supported on a base at the lower end of the guides 7a. The lower end of the cylinder 10 is supplied with fluid under pressure by means of a pump 10x suitably connected with a reservoir 10x'.

The piston 10a is connected to a rod (not shown) the upper end of which engages a cross member 10b, which spans the upper ends of the guides 7b to raise the guides. The supply of fluid under pressure to the cylinder 10 and return flow therefrom during the lowering movement of the elevating member 8 is controlled by a valve mechanism in a casing 11, the valve mechanism being operated by a lever 11a. The upper end of the piston rod is provided with a crosshead 10c having laterally extending shafts that support sprockets 10d, which are engaged by chains 10e. The inner ends of the chains are suitably anchored, preferably on the side wall of cylinder 10, and their outer ends are connected to the elevating member 8, whereby the latter is raised when the cross-head 10c is operated upwardly.

The hydraulically operated raising mechanism 7 is mounted for tilting about trunnions 12 on bearings 12a provided on frame extensions 1a at the front end of the frame 1. The lower end of each guide 7a is provided with an inwardly extending bracket 13, the outer end of which is connected to the outer end of a piston rod 13a. The inner end of the rod 13a extends into a cylinder 14 and is provided with a reciprocatable piston 14a. The rear end of cylinder 14 is pivotally anchored to the frame 1. The opposite ends of the cylinders 14 (one only being shown) are connected with the fluid supply under pressure so that the fluid under pressure may be supplied to the corresponding ends of the cylinders 14 and the discharge of fluid from their opposite ends may be controlled by means of a valve mechanism in the casing 11 to operate the pistons 14a in either direction. This control is effected by operation of a lever 15 connected to the valve mechanism. It will be understood that the mechanisms for raising the elevating member 8 and tilting the guides form no part of the present invention and may be of any preferred form and arrangement; for example, as shown in Letters Patent No. 2,471,429 to P. E. Hawkins.

A service brake pedal 16 is connected by suitable linkage 16a to a band or shoe 16c and is adapted to engage a drum 16d fixed to the extended outer end of the shaft for the motor 5 (see Fig. 1). An emergency lever 16b is also suitably connected to the linkage 16a so that this lever can also be used to press the shoe 16c against the drum 16d.

The generator 20 that is employed for generating the electric current for energizing the electric motor 5, is provided with an armature 19 that is coupled to the drive shaft 18 of the gas engine 17, the speed of the engine shaft being manually controlled by a pedal, as later set forth. 17a indicates an electric battery for supplying current to a starting motor 17b. 17c is a generator. The generator 20 is also provided with series and shunt connected field windings that are connected as shown in Figs. 4 and 5 which will be described hereinafter. The generator 20 and the gas engine 17 are of conventional design. However, these units are provided with controls which will also be described in detail in the description of the electric wiring diagrams employed in this apparatus.

Referring to Fig. 4 there is shown a wiring diagram and controller contact arrangement provided for disconnecting the electric motor and generator and for connecting the motor armature shaft to its field and to the generator for forward rotation or for reverse rotation. The electric motor 5 is provided with an armature 5a and a series field winding 5b. The brushes of the armature 5a are connected to the movable contactors III and V of the selector drum control 21. One terminal of the series field 5b of the motor is connected to the movable contactor IV of the selector drum 21 and the other terminal of this field is connected to one terminal of the series field 20b of the generator 20. The other terminal of the generator series field is connected to one side of the generator shunt field 20c and to one brush of the armature 20a. The other side of the shunt field 20c is connected to the movable contactor I of the selector drum 21 and the other brush of the generator armature 20a is connected to the movable contactor II of the selector drum 21.

From the circuit diagram shown in Fig. 4 it will be apparent that when the selector drum 21 is in the "off" position all of the circuits of the motor 5 and generator 20 are open except for the connection between the series field 5b of the motor and the series field 20b of the generator. The circuit of the shunt field 20c of the generator is also open when the selector drum 21 is in the "off" position. As a result the generator is provided only with the residual magnetic field so that the generated voltage is relatively small at this time.

When the selector drum is placed in the forward position so that the motor 5 is driven in the desired direction to move the vehicle forward, the rotatable contactors I, II, III, IV and V of the selector drum 21 are moved so that the contactors I, II and III are connected together by the copper segment 21a and the contacts IV and V are connected together by the copper segment 21b. Thus the shunt field 20c of the generator 20 is connected across the armature 20a and the armature 5a of the motor is connected across the generator through the series field 5b of the motor. The motor 5 is thus energized from the generator 20 and caused to rotate in a forward direction. When the motor 5 is to be reversed the movable contacts of the selector drum 21 are rotated so that the contacts I, II and V are connected together through the copper segment 21c and the contacts III and IV are connected together through the segment 21d. Thus the circuit of the motor armature 5a is reversed with respect to the motor field 5b and the direction of rotation of the motor armature is accordingly also reversed.

The rotatable contactors of the selector drum 21 are supported by a suitable insulation support which is mounted to be controlled by the rotatable shaft 21e and control lever 21f that are mounted on the steering column 6 of the vehicle so as to be conveniently accessible to the vehicle operator.

The selector drum control 21 is shown in Fig. 4 in its off or open circuit position, and it may be rotated in one direction or the other depending upon whether forward motion or backward motion of the vehicle is desired. When this control is moved to produce forward motion the contactors I, II and III are connected together by the segment 21a and the contacts IV and V are connected together by the segment 21b. Thus the shunt field winding 20c of the generator 20 is connected across the armature 20a and the armature of the motor 5 is connected to receive current from the generator through the series field winding 5b of the motor and the series field winding 20b of the generator. The vehicle is now connected to move forward, however, it will not move because the idling voltage generated by the generator 20 is insufficient to operate the motor when the motor is loaded. Upon depressing the accelerator pedal 44 the operator opens the throttle of the gas engine 17 and causes the voltage generated by the generator 20 to increase gradually as the field excitation of this generator is increased so that the motor 5 gradually picks up speed and at the same time moves the vehicle forward. The same operation takes place when the control 21 is connected to reverse the direction of rotation of the motor 5. At this time the contacts I, II and V of the control 21 are connected together by the segment 21c and the contacts III and IV are connected together by the segment 21d, so that the direction of the current flow through the armature 5a with respect to the current flow through the field winding 5b, is reversed.

In Fig. 5 there is illustrated a wiring diagram of a modified form of circuit arrangement employed in accordance with this invention. In this modification the controller 22 is also provided with 5 rotatable contacts I, II, III, IV and V and an additional contact VI which are mounted on suitable insulation material 25 and are also adapted to be rotated by the rod 21e and lever 21f that are mounted on the steering column 6 as shown in Fig. 1.

The brushes of the motor armature 5a are connected to the contacts III and V of the controller 22. One side of the series field 5b of the motor is connected to the contact IV and the other side of this field is connected to the common connection between the dynamic braking resistor 23 and the series field 20b of the generator. The other side of the resistor 23 is connected to one side of the dynamic brake hold-in coil 24 and the other side of this coil 24 is connected to the contact VI of the controller 22. The shunt field 20c of generator 20 is connected to contact I in the same manner as in Fig. 4.

The contact II of the controller 22 is connected to one side of the armature 20a of the generator 20 and the other side of this armature is connected to the series field 20b of this generator. The shunt field 20c of the generator is connected across the armature.

The contactors I to VI of the controller 22 are mounted on the insulation support 25 to which is attached the notched disc 26 that is provided with notches 27, 28, 29, 30 and 31 in its periphery. These notches are shaped to receive the tooth 32 of the lever 33 for the purpose to be described hereinafter. The lever 33 is pivoted on the pivot 34 and is provided with a small roller 35 supported by the pin 36 positioned at one end of the lever. The roller 35 is arranged to engage the rotatable cam 37 that is mounted on the shaft 38 to be rotatable by the lever 39 that is connected to the internal combustion engine throttle by the flexible cable 40. A spring 41 is also attached to the lever 39 to return this lever and the cam 37 to the idling position. The other end of the lever 33 is attached to the magnetic armature 42 that is associated with the dynamic brake hold-in coil 24. This armature 42 is adapted to be attracted by the magnetic field set up by the coil 24 when current generated by the armature 5a of the motor 5 passes through the coil 24 during dynamic braking operation. During this operation the armature 42 is pulled into the coil 24 against the action of the spring 43 which is positioned between the lever 33 and the frame.

The selector drum control 22 employed in the arrangement shown in Fig. 5 is designed so that dynamic braking is applied to the motor 5 during a certain braking period until the motor speed has reduced to a predetermined value. This dynamic braking is applied while the tooth 32 of the lever 33 engages the disc 26 of the selector drum in either notch 28 or notch 30. When the motor 5 is to be connected for forward rotation the disc 26 is moved counter-clockwise from its neutral position. However, this motion is not possible unless the cam 37 is in its idling position shown in Fig. 5, thereby permitting the spring 43 to lift the lever 33 and the tooth 32 carried thereby, out of the notch 29.

When the selector drum is moved counter-clockwise from its neutral position the contacts VI and V engage the copper segment 22a and the contacts III and IV engage the copper segment 22b. Thus the armature 5a of the motor 5 is connected in series with the field winding 5b, the resistor 23 and the coil 24. If the armature 5a is rotating when this connection is made, dynamic braking will be applied thereto because the circuit through the field 5b, the resistor 23 and the coil 24 is sufficiently low resistance to allow a relatively large current generated by the motor armature to flow therethrough. The effort required to generate this relatively heavy current in the armature applies a braking action to said armature. At the same time the magnetic field set up in the coil 24 by the braking current attracts the armature 42 and pulls the lever 33 down against the spring 43, thereby causing the tooth 32 to engage the disc in the elongated notch 30 so that rotation of the disk 26 is limited to the length of this notch. Thus, the lever 33 carrying the tooth 32 constitutes a normally retracted latch which cooperates with the notches 28 and 30 in the disk 26 to prevent operation of the controller into the forward and reverse running positions so long as the current in the dynamic braking circuit is above a predetermined value.

When the current generated by the armature 5a is reduced to a low value the coil 24 can no longer retain the armature 42 therein against the action of the spring 43 and the lever 33 is released upward. The selector drum disc 26 and the contactors may then be rotated so that the motor may be connected to run in the forward direction. The tooth 32 of the lever 33 will then be opposite the notch 31. The contacts I, II and V are then connected together by the segment 22a thereby connecting one side of the armature 5a to one side of the generator 20. The contacts III and IV are connected together by the segment 22b thereby connecting the other side of the armature 5a to one side of the series field 5b, and contact VI is free. The motor is now connected for forward rotation and as soon as the throttle of the gas engine 17 is operated the cable 40 rotates the cam 37 and causes the tooth of the lever 33 to engage the disc 36 in the notch 31, thereby locking the selector drum in a forward rotation position. At the same time the speed of the gas engine is increased and the voltage generated by the generator is also increased so that the power supplied to the motor 5 is sufficient to cause it to drive the vehicle.

When the throttle is returned to its idling position the cam 37 is also returned to its idling position and the tooth 32 of the lever 33 is withdrawn from the notch 31. The selector drum may then be rotated in either direction to connect the braking circuit to the armature 5a of the motor as previously described. The braking current will set up a magnetic field in the coil 24 and cause the tooth 32 of the lever 33 to engage the disc 26 and the notch 28 (or the notch 30) as explained above. When the motor armature is stopped or sufficiently reduced in speed the armature 42 is pulled out of the coil 24 by the action of the spring 43 and the disc 26 of the selector drum may be rotated to its neutral position.

When it is desired to reverse the direction of rotation of the motor 5 the switch or controller 22 is turned clockwise from its neutral position so that the contactors VI, V, III and IV contact the segments 22c, 22d, 22e and 22f respectively, to first connect the dynamic braking circuit to the armature 5a and field 5b of the motor. It will be observed that the segments 22c and 22e are connected together and the segments 22d and 22f are also connected together whereby the connections between the armature 5a and the field 5b are reversed when the controller 22 is turned clockwise from what these connections were when the controller 22 was turned counter-clockwise. The reversal of these connections effects reversal in the direction of the rotation of the armature 5a of the motor.

Dynamic braking is accomplished while the contactors VI, V, III and IV contact the segments 22c, 22d, 22e and 22f respectively, and contacts I and II are free, and during this time the dynamic brake hold-in coil 24 is energized by the braking current and the magnetic field set up by this coil pulls the armature 42 into the coil and causes the lever 33 to be pulled down whereby the tooth 32 engages the elongated notch 28 and limits the movement of the selector drum of the controller to the length of this notch during the dynamic braking operation.

It will be observed that both notches 28 and 30 which are engaged during the braking operation are substantially less than half the depth of the notches 27, 29 and 31. The purpose of this is to limit the downward movement of the left hand part of the lever 34 so that the roller 35 does not release the cam 37 during the dynamic braking operations so that the gas engine throttle can not be advanced during dynamic braking. When the tooth 32 is opposite any one of the notches 27, 29 or 31 the lever 33 may be tilted on its pivot 34 sufficiently to release the cam 37. Thus when the motor is connected to rotate either forward or in reverse or if the controller 22 is in its neutral position, the lever 33 will not impede rotation of the cam 37.

When the controller 22 is in the forward running position the circuit of the dynamic brake is interrupted because the segment 22a does not contact the contactor VI in this position. However, the contactor V engages the segment 22a and the circuit between the generator 20 and the motor 5 is thus completed. Likewise, when the controller is in the reverse position the contactor VI no longer engages the segment 22c and the circuit of the dynamic brake is thus interrupted. In this position the contactor III engages the segment 22e which is also contacted by the contactors I and II so that the generator 20 is connected to the motor 5.

From the foregoing description it will be observed that the electric connections to the travel motor, whereby the latter drives the vehicle forwardly or rearwardly, are dependent on the manual operation of a lever, whereas the starting of the motor from zero to various running speeds is controlled by manual operation of the throttle for the internal combustion engine, so that a series resistance control system and a clutch are eliminated.

In the modified control system shown in Fig. 6, the generator and motor are connected together through a controller in the same manner as in Fig. 4, except for additional elements in the shunt field circuit of the generator. The controller 21 of Fig. 4 or the controller 22 of Fig. 5 may be used for Fig. 6.

For the purpose of securing quick voltage build-up of the generator, especially in case of a generator having a slow build-up, provision is made to energize the shunt field from a separate source when the throttle is moved from the idling position, and the separate source is automatically disconnected when the motor reaches a certain speed. For this purpose, the connection from the shunt field 20c to the contactor I includes a normally open switch 44, a battery or other source of current supply 45, and a pair of normally closed contacts 46 of a relay 47 having its winding connected between contactors II and IV. The normally open switch 44 is arranged to be moved to closed position by opening of the throttle, see for example, the arrangement of Fig. 5, where the switch is operated by the lever 33. Closing of switch 44 connects battery 45 in series with the shunt field 20c and excites this field if the controller is in one operating position. The generator voltage builds up quickly, and as soon as the output voltage of the generator rises to a certain value, relay 47 operates to open contacts 46, disconnecting battery 45, and closes contacts 48 to complete the shunt field circuit around the contacts 46.

To those skilled in the art to which our invention relates many changes in construction and widely differing embodiments and applications of the invention will suggest themselves without departing from the spirit and scope of the invention. Our disclosures and the description herein are purely illustrative and not intended to be in any sense limiting.

What we claim is as follows:

1. In an electrically driven vehicle the combination of a generator for generating electric current, said generator having an armature, a series field and a shunt field, an electric motor having an armature and a series field winding, connections for connecting said motor to said generator, and a rotatable controller for controlling said connections between said motor and said generator, said controller having an "off" position, a "forward" position and a "reverse" position, said controller comprising means for disconnecting both sides of said motor from said generator and for interrupting said generator shunt field circuit when said controller is in said "off" position so that substantially no voltage is generated when said controller is in said "off" position, said controller also comprising connections for connecting said motor to run forward or reverse when said controller is at the corresponding positions, and a dynamic braking circuit, said controller further comprising means for connecting said dynamic braking circuit to said motor at intermediate positions on either side of the "off" position and before the controller may be connected to run said motor forward or reverse.

2. In an electrically driven vehicle the combination of a generator for generating electric current, a gas engine having a throttle, means for coupling said gas engine to drive said generator, an electric motor, a field winding for said motor, a dynamic brake circuit including said field winding and the armature of said motor, means for closing said dynamic brake circuit before said motor is connected to said generator to rotate either forward or backward, said means including a controller having contacts for connecting said motor to rotate forward or backward, and means controlled by current in the brake circuit to prevent operation of said controller to connect said motor to rotate forward or backward and to prevent operation of said throttle until said dynamic brake reduces the speed of said motor to a predetermined value.

3. In an electrically driven vehicle the combination of a generator, a gas engine having a throttle, means for coupling said gas engine to drive said generator, an electric motor having a series field and an armature, a dynamic brake circuit including said motor field and armature, a controller having contacts for connecting said motor to said generator to run either forward or backward, said controller also having contacts for closing said dynamic brake circuit when dynamic braking is to be applied to said motor, a member supported by said controller, said member having indentations corresponding to the forward and backward operating positions of said controller at which said motor is connected to run forward or backward respectively, a lever having means adapted to engage selected ones of said indentations, and an element connected to the throttle of said engine, said element having means engaging said lever to prevent operation of said throttle when said dynamic brake circuit is closed.

4. In an electrically driven vehicle the combination of a generator, a gas engine having a throttle, means for coupling said gas engine to drive said generator, an electric motor having a series field and an armature, a dynamic brake circuit including said motor field and armature, a controller having contacts for connecting said motor to said generator to run either forward or backward, said controller also having contacts for closing said dynamic brake circuit when dynamic braking is to be applied to said motor, means for rotating said controller for establishing the desired connections therein, a disc supported and adapted to be rotated by said last mentioned means, said disc having indentations corresponding to the forward and backward operating positions of said controller at which said motor is connected to run forward or backward respectively, a lever having means adapted to engage selected ones of said indentations to limit the motion of said disc, and an element connected to the throttle of said engine, said element having means engaging said lever to prevent operation of said throttle when said dynamic brake circuit is closed.

5. In an electrically driven vehicle the combination of a generator, a gas engine having a throttle, means for coupling said gas engine to drive said generator, an electric motor having a series field and an armature, a dynamic brake circuit including said motor field and armature, a controller having contacts for connecting said motor to said generator to run either forward or backward, said controller also having contacts for closing said dynamic brake circuit when dynamic braking is to be applied to said motor, means for rotating said controller for establishing the desired connections therein, a disc supported and adapted to be rotated by said last mentioned means, said disc having indentations corresponding to the forward and backward operating positions of said controller at which said motor is connected to run forward or backward respectively, said disc having an additional indentation between said first mentioned indentations, said additional indentation corresponding to a position of said controller at which dynamic braking is applied to said motor, a lever having means adapted to engage selected ones of said indentations to limit the motion of said disc, and an element connected to the throttle of said engine, said element having means engaging said lever to prevent operation of said throttle when said dynamic brake circuit is closed.

6. The combination set forth in claim 3 further characterized in that said dynamic brake circuit also includes a dynamic brake hold-in coil, a magnetic armature associated with said coil and means for connecting said armature to said lever whereby said lever is caused to lock said controller in its dynamic braking position as long as said coil is sufficiently energized during dynamic braking of the motor.

7. The combination set forth in claim 4 further characterized in that the dynamic brake circuit includes a dynamic brake holding coil connected to be energized by the dynamic braking current when said controller is positioned to close the circuit to apply dynamic braking to said motor, an armature associated with said coil and means for connecting said armature to said lever whereby said lever is adapted to lock said disc during dynamic braking of said motor as long as said coil is sufficiently energized by the braking current.

8. The combination as set forth in claim 5 further characterized in that said dynamic brake circuit includes a coil having an armature associated therewith, means for connecting said armature to said lever whereby said lever is caused to engage the additional indentation of said disc as long as sufficient braking current flows through said coil during the dynamic braking of said motor.

9. In an electrically driven vehicle the combination of a generator for generating electric current, a gas engine having a throttle, means for coupling said gas engine to drive said generator, an electric motor having an armature, a dynamic brake circuit including the armature of said motor, a controller for energizing said motor from said generator, said controller having an operating member movable in opposite directions from a neutral position into forward and reverse running positions, means controlled by said operating member in intermediate positions on either side of said neutral position for closing said dynamic brake circuit, and means controlled by the current in said braking circuit to prevent operation of said throttle until said dynamic braking reduces the speed of said motor to a predetermined value.

10. In an electrically driven vehicle the combination of a generator for generating electric current, an electric motor having an armature, a dynamic braking circuit including the armature of said motor, a reversing controller for driving said motor in opposite directions from said generator, said controller having an operating member movable in opposite directions from a neutral position into forward and reverse running positions, means controlled by said operating member in intermediate positions on either side of said neutral position for closing said braking circuit, and means rendered operative by the current in said braking circuit for preventing operation of said operating member into either of said running positions while said current is above a predetermined value, said means comprising a normally retracted latch member and an electromagnet energized by current in said braking circuit for moving said member into latching position.

ROBERT H. DAVIES.
EDWARD R. SIROTAK.

References Cited in the file of this patent

UNITED STATES PATENTS

| Number | Name | Date |
|---|---|---|
| 584,341 | Fiske | June 15, 1897 |
| 748,635 | Muschenheim et al. | Jan. 5, 1904 |
| 800,118 | Lemp | Sept. 19, 1905 |
| 1,770,723 | Wyman | July 15, 1930 |
| 1,820,864 | Neuland | Aug. 25, 1931 |
| 1,851,725 | Peters et al. | Mar. 29, 1932 |
| 1,924,851 | Gumpper | Aug. 29, 1933 |
| 2,138,231 | Gebhardt | Nov. 29, 1938 |
| 2,179,364 | Weber | Nov. 7, 1939 |
| 2,187,781 | Greer | Jan. 23, 1940 |
| 2,231,521 | Curry | Feb. 11, 1941 |
| 2,245,083 | Webb et al. | June 10, 1941 |
| 2,318,043 | Austin | May 4, 1943 |
| 2,397,226 | Weybrew | Mar. 26, 1946 |

FOREIGN PATENTS

| Number | Country | Date |
|---|---|---|
| 5,671 | Great Britain | Mar. 8, 1907 |